United States Patent
Yaqub et al.

(10) Patent No.: US 12,079,789 B1
(45) Date of Patent: Sep. 3, 2024

(54) FORENSIC ASSISTING AND TRACING FOR AUTOMATED TELLER MACHINES

(71) Applicant: Wells Fargo Bank, N.A., San Francisco, CA (US)

(72) Inventors: Raziq Yaqub, Stewartsville, NJ (US); Abhijit Rao, Irvine, CA (US)

(73) Assignee: Wells Fargo Bank, N. A., San Francisco, CA (US)

( * ) Notice: Subject to any disclaimer, the term of this patent is extended or adjusted under 35 U.S.C. 154(b) by 598 days.

(21) Appl. No.: 17/192,287

(22) Filed: Mar. 4, 2021

Related U.S. Application Data

(62) Division of application No. 15/716,229, filed on Sep. 26, 2017, now Pat. No. 10,949,821.

(51) Int. Cl.
| | |
|---|---|
| *G06Q 40/00* | (2023.01) |
| *G06F 16/16* | (2019.01) |
| *G06Q 20/10* | (2012.01) |
| *G07F 19/00* | (2006.01) |

(52) U.S. Cl.
CPC ....... *G06Q 20/1085* (2013.01); *G06F 16/164* (2019.01); *G06Q 40/00* (2013.01); *G07F 19/207* (2013.01); *G07F 19/209* (2013.01)

(58) Field of Classification Search
CPC ............. G06Q 20/308; G06Q 20/4016; G06Q 20/1085; G06Q 20/389; G06Q 20/4015; G06F 16/164; G06F 9/547; G06F 2221/2111; G06F 9/451; G06F 21/44
USPC .................................................. 235/379, 380
See application file for complete search history.

(56) References Cited

U.S. PATENT DOCUMENTS

| | | | |
|---|---|---|---|
| 4,321,672 A | 3/1982 | Braun et al. | |
| 5,220,501 A | 6/1993 | Lawlor et al. | |
| 6,292,789 B1 | 9/2001 | Schutzer | |
| 7,100,195 B1 * | 8/2006 | Underwood | H04L 63/0823 |
| | | | 707/999.009 |
| 8,474,695 B1 * | 7/2013 | McCoy | G07F 19/207 |
| | | | 235/379 |
| 10,949,821 B1 | 3/2021 | Yaqub et al. | |
| 2004/0044739 A1 * | 3/2004 | Ziegler | G07F 7/0826 |
| | | | 709/213 |

(Continued)

OTHER PUBLICATIONS

De Angeli et al., "Introducing ATMs in India: a contextual inquiry"; Elsevier, Nov. 3, 2003, 16 pp.

(Continued)

*Primary Examiner* — Daniel St Cyr
(74) *Attorney, Agent, or Firm* — Shumaker & Sieffert, P. A.

(57) ABSTRACT

Techniques are described for performing forensic assisting and tracing of transaction data from an automated teller machine (ATM) to detect suspicious activity and potential security threats. The techniques include a forensic assisting and tracing (FAST) ATM configured to intercept data packets including transaction data generated by the ATM; map, store, and index the transaction data; and analyze metadata for the transaction data to generate reports on the operation of the ATM for a higher-level hub server. In some examples, a plurality of FAST ATMs may be networked to the hub server such that the hub server receives reports from each of the individual FAST ATMs and analyzes the reports to identify larger, global trends of suspicious activity and potential security threats.

20 Claims, 7 Drawing Sheets

(56) References Cited

U.S. PATENT DOCUMENTS

| | | |
|---|---|---|
| 2015/0262136 A1 | 9/2015 | Clementi et al. |
| 2015/0347759 A1* | 12/2015 | Cabrera ................ G06F 21/577 |
| | | 726/25 |
| 2016/0344715 A1 | 11/2016 | Kumar et al. |
| 2016/0364727 A1 | 12/2016 | Delawter et al. |
| 2017/0006010 A1 | 1/2017 | Miu |
| 2017/0046679 A1 | 2/2017 | Gotlieb et al. |
| 2017/0068958 A1 | 3/2017 | Oberheide et al. |
| 2017/0091730 A1* | 3/2017 | Gurunathan .......... G06F 21/121 |
| 2018/0270612 A1* | 9/2018 | Thoresen .................. G01S 1/02 |
| 2019/0182627 A1* | 6/2019 | Thoresen .............. H04L 63/045 |
| 2019/0259033 A1* | 8/2019 | Reddy ...................... G06N 5/02 |

OTHER PUBLICATIONS

Security News Desk: "ATM security in the battle against fraud and physical attacks," Jun. 27, 2016, 4 pp.

"HPE ATM Transaction Analyzer," Hewlett Packard Enterprise, Data Sheet, Nov. 2016, 8 pp.

"Reduce Money Laundering Risks with Rapid, Predictive Insights," Solution Brief, Cloudera, Intel, 2015, accessed on Mar. 29, 2017, 8 pp.

Gorkoff, "Unlocking your ATM 'Big Data," INETCO, Mar. 18, 2014, 6 pp.

Prosecution History from U.S. Appl. No. 15/716,229, dated Feb. 19, 2020, through Nov. 17, 2020, 29 pp.

\* cited by examiner

FORENSIC ASSISTING AND TRACING FOR AUTOMATED TELLER MACHINES

This application is a divisional application of U.S. patent application Ser. No. 15/716,229, filed Sep. 26, 2017, the contents of which is hereby incorporated by reference in its entirety.

TECHNICAL FIELD

The disclosure relates to automated teller machines.

BACKGROUND

Automated teller machines (ATMs) provide account holders with a convenient option for making monetary deposits to and withdrawals from their accounts at financial institutions from remote locations. Additionally, certain financial institutions may allow their account holders to perform transactions using ATMs serviced by other financial institutions, providing an even wider range of locations for the account holder to perform transactions. In addition to providing more convenient locations, ATMs may also provide account holders with more convenient hours of operation by being available for use during times when a financial institution's retail banking locations are closed, otherwise unavailable, or busy. Thus, ATMs provide a wide range of locations and times at which account holders may perform deposits and withdrawals, making these transactions more convenient than if the account holder were limited to performing them only at a retail banking location during its operating hours.

Despite their utility, ATMs are still vulnerable to security threats that can be detrimental to financial account holders and financial institutions. These security threats may be either physical or logical in nature. A physical threat involves an attack on an ATM user or on the ATM itself at its actual location. Logical threats involve cyber-attacks such as denial of service (DOS), distributed DoS (DDOS), malware, or trojans that may attempt to take control of the ATM or exploit another node on the ATM network for financial gain.

SUMMARY

In general, this disclosure describes techniques for performing forensic assisting and tracing of transaction data from an automated teller machine (ATM) to detect suspicious activity and potential security threats. The techniques include a forensic assisting and tracing (FAST) ATM that is communicatively coupled to a higher-level hub server. The FAST ATM is configured to intercept data packets including transaction data generated by the ATM; map, store, and index the transaction data; and analyze metadata for the transaction data to generate reports on the operation of the ATM for the hub server. In some examples, a plurality of FAST ATMs may be networked to the hub server such that the hub server receives reports from each of the individual FAST ATMs and analyzes the reports to identify larger, global trends of suspicious activity and potential security threats.

In one example, this disclosure is directed toward an ATM comprising a memory, and one or more processors in communication with the memory. The one or more processors are configured to intercept one or more data packets generated by the ATM for transmission toward a bank server, the one or more data packets including transaction data of a requested financial transaction; map the transaction data included in the data packets to a time stamp indicating the time at which the financial transaction was requested and to context data collected from the ATM and having the same time stamp; and store the mapped transaction data in a database for the ATM. The one or more processors are further configured to generate metadata for the mapped transaction data based on one or more parameters associated with the mapped transaction data; store the metadata for the mapped transaction data in the database for the ATM; and generate one or more reports on operation of the ATM for a hub server, wherein the one or more reports are generated based on analysis of at least a portion of the metadata for the mapped transaction data.

In another example, this disclosure is directed toward a computer-based method comprising intercepting, by an ATM, one or more data packets generated by the ATM for transmission toward a bank server, the one or more data packets including transaction data of a requested financial transaction; mapping, by the ATM, the transaction data included in the data packets to a time stamp indicating the time at which the financial transaction was requested and to context data collected from the ATM and having the same time stamp; storing, by the ATM, the mapped transaction data in a database for the ATM; generating, by the ATM, metadata for the mapped transaction data based on one or more parameters associated with the mapped transaction data; storing, by the ATM, the metadata for the mapped transaction data in the database for the ATM; and generating, by the ATM, one or more reports on operation of the ATM for a hub server, wherein the one or more reports are generated based on analysis of at least a portion of the metadata for the mapped transaction data.

In a further example, this disclosure is directed toward a server device in communication with a plurality of ATMs, the server device comprising a memory including a database that stores mapped transaction data and metadata for the mapped transaction data for each of the plurality of ATMs, and one or more processors in communication with the memory. The one or more processors are configured to receive reports on operation of each of the plurality of ATMs; detect suspicious activity occurring at one or more of the plurality of ATMs; and determine a threat signature for the suspicious activity based on analysis of one or more of the database for the plurality of ATMs or the reports on operation of the plurality of ATMs.

In an additional example, this disclosure is directed toward a computer-based method comprising storing, in a database of a server device in communication with a plurality of ATMs, mapped transaction data and metadata for the mapped transaction data for each of the plurality of ATMs; receiving, by the server device, reports on operation of each of the plurality of ATMs; detecting, by the server device, suspicious activity occurring at one or more of the plurality of ATMs; and determining, by the server device, a threat signature for the suspicious activity based on analysis of one or more of the database for the plurality of ATMs or the reports one operation of the plurality of ATMs.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
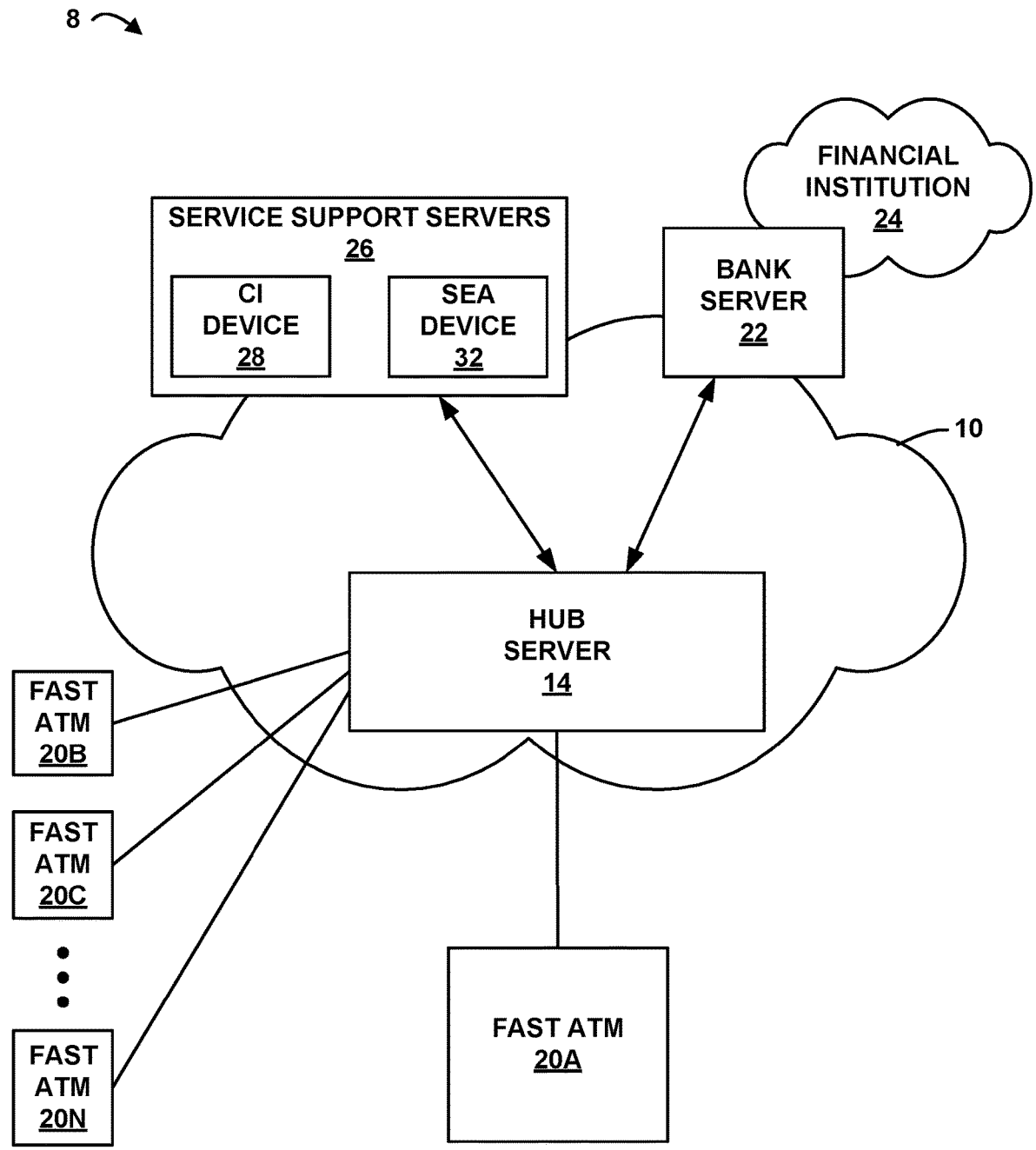
FIG. 1 is a block diagram illustrating an example network system including a plurality of forensic assisting and tracing (FAST) ATMs in communication with a hub server, in accordance with the techniques of this disclosure.

FIG. 1 is a block diagram illustrating an example network system 8 including a plurality of forensic assisting and tracing (FAST) ATMs 20A-20N (collectively "FAST ATMs 20") in communication with a hub server 14, in accordance with the techniques of this disclosure. As illustrated in FIG. 1, network system 8 includes FAST ATMs 20 in communication with hub server 14, which is in communication with a bank server 22 of financial institution network 24 and service support servers 26 via a network 10. In some examples, service support servers 26 may include a chief investigator (CI) device 28 and a suspicious event aggregator (SEA) device 32. In other examples, at least CI device 28 may be hosted on hub server 14. Each of FAST ATMs 20 comprises a physical ATM.

Network 10 may comprise a private network, e.g., associated with a financial institution, or a public network, such as the Internet. Although illustrated as a single entity, network 10 may comprise a combination of two or more public and/or private networks. Network 10 may comprise one or more of a wide area network (WAN) (e.g., the Internet), a local area network (LAN), a virtual private network (VPN), or another wired or wireless communication network. In some examples, network 10 may be a service provider network coupled to one or more networks administered by other providers, and may thus form part of a large-scale public network infrastructure, e.g., the Internet.

Bank server 22 may be associated with a financial institution and included within financial institution network 24. The functionality of bank server 22 may be implemented in hardware or in a combination of software and hardware, where requisite hardware may be provided to store and execute software instructions. While shown as a single computing device in the example of FIG. 1 for purposes of illustration, in some examples, bank server 22 may include a distributed network of computing devices including one or more workstations, servers, and/or other computing devices within financial institution network 24.

The financial institution may be a traditional bank or credit union with the capability to maintain user accounts, or a credit card company with the capability to issue credit and debit accounts. For example, the financial institution may maintain checking, savings, and/or investment accounts for account holders. Bank server 22 and other similar servers (not shown) of financial institution network 24 may be in communication with a plurality of ATMs associated with the financial institution, e.g., including FAST ATMs 20 and conventional ATMs (not shown) via network 10. Although illustrated in FIG. 1 as being in communication with FAST ATMs 20 via hub server 14, in other examples bank server 22 may be in direct communication with each of FAST ATMs 20.

Bank server 22 may authenticate users of the ATMs based on login credentials, e.g., an account number, a personal identification number (PIN), biometric data, or other user identifiers, entered at the ATMs. After authentication, bank server 22 may access information related to the accounts of the authenticated users held at the financial institution and perform financial transactions requested by the users via the ATMs. For example, bank server 22 may perform financial transactions including one or more of cash withdrawals, fund deposits, fund transfers, or account balance checks.

FAST ATM 20A is a computing device that comprises a physical ATM. FAST ATM 20A may include a card reader and a display device on which to present a graphical user interface (GUI) to a user providing options for entering login credentials and performing one or more financial transactions. In some examples, the display device may include a touchscreen to receive input from the user indicating a selection via the displayed GUI. Alternatively, or additionally, FAST ATM 20A may include a keypad or other input device for receiving inputs from the user. FAST ATM 20A may also include components for vending or accepting cash and/or checks for various transactions including, for example, withdrawals and deposits. FAST ATM 20A may include a printer component for printing documents for various transactions including, for example, receipts for withdrawals, deposits, transfers, and account balance checks.

FAST ATM 20A receives login credentials and financial transaction requests via one or more of the user input devices of FAST ATM 20A, and communicates with bank server 22 to authenticate the user and perform the user-initiated financial transactions. More specifically, FAST ATM 20A sends one or more data packets toward bank server 22 requesting the user-initiated financial transaction. The data packets include transaction data of the financial transaction, such as a source account number, a destination account number (if applicable), a user identifier, a transaction amount, and the like.

In accordance with the techniques described in this disclosure, FAST ATM 20A is configured to perform forensic assisting and tracing of the transaction data to detect suspicious activity and potential security threats. In general, ATMs are vulnerable to security threats that can be detrimental to financial account holders and financial institutions. These security threats may be either physical or logical in nature. A physical threat involves an attack on an ATM user or on the ATM itself at its actual location. Logical threats involve cyber-attacks such as denial of service (DOS), distributed DoS (DDoS), malware, or trojans that may attempt to take control of the ATM or exploit another node on the ATM network for financial gain. In order to recognize, anticipate, and protect against such security attacks, it may be helpful to keep a complete record of ATM transactions including information about the associated users/transactors at the ATMs and contextual information collected from the ATMs at the time of the transactions. This data may be used for cyber forensics and internal investigations conducted on behalf of associated financial institutions to uncover fraudulent schemes and fraudsters themselves. The data packet traffic between ATMs and associated bank servers carries much of the data that may assist in evaluating ATM performance and assessing future trends with respect to potential security threats.

According to the techniques of this disclosure, FAST ATM 20A is configured to intercept the data packets including transaction data of a financial transaction prior to transmission from FAST ATM 20A toward bank server 22, map, store, and index the transaction data, and analyze metadata for the transaction data to generate reports on the operation of FAST ATM 20A for hub server 14. The term "intercept" is used in this disclosure to mean that FAST ATM 20A essentially stores a copy of the data packet in either a local or remote database (not shown in FIG. 1). Unless otherwise instructed, e.g., by hub sever 14, FAST ATM 20A does not modify, destroy, or block the data packets from reaching bank server 22. In this way, the financial transactions initiated by the user of FAST ATM 20A may continue to be performed by bank server 22 while FAST ATM 20A processes and stores the transaction data.

Prior to storing the transaction data in the database, FAST ATM 20A maps the transaction data to a time stamp indicating the time at which the financial transaction was requested and to context data collected from FAST ATM 20A and having the same time stamp. The context data may include sensor data from FAST ATM 20A, such as camera data captured by surveillance cameras installed in FAST ATM 20A. The context data may also include location data of FAST ATM 20A, system event data indicating functions performed at FAST ATM 20A to request the financial transaction, and financial event data indicating functions performed by FAST ATM 20A with bank server 22 to perform the financial transaction. To map the transaction data, FAST ATM 20A may generate a virtual data stream having a plurality of data fields including the timestamp, the transaction data, and any associated context data.

While storing the mapped transaction data in the database, FAST ATM 20A also generates metadata for the mapped transaction data based on one or more parameters associated with the mapped transaction data. For example, to generate the metadata, FAST ATM 20A may analyze each of the data fields included in the virtual data stream, and identify one or more parameters of each of the data fields that are used to generate reports for hub server 14. FAST ATM 20A then generates the metadata as an index to each of the identified parameters of each of the data fields. FAST ATM 20A then stores the metadata (or indices) for the mapped transaction data in the same database with the mapped transaction data. The database for FAST ATM 20A may be a local database included in the memory of FAST ATM 20A or a remote database included in a remote computing device, e.g., hub server 14 or another network device not shown in FIG. 1. The remote database may store mapped transaction data and corresponding metadata for all of FAST ATMs 20.

In general, data indexing is done for fast searching of records in a database. Generating an index on parameters of a data field or multiple fields creates another data structure, called metadata, which binds the data field parameter value and a pointer to the related record stored in the database. Indexing may be done on a data field parameter value included in a header and/or a payload of each of the intercepted data packets or the associated context data. The data field parameter values may be, for example, a user/transactor ID included in the data packet payload, an IP address or port number included in the data packet header, a particular system event ID or financial event ID, or an image pattern in the camera data.

After storing the mapped transaction data and corresponding metadata in the database, FAST ATM 20A analyzes at least a portion of the metadata for the mapped transaction data to generate one or more reports on the operation of FAST ATM 20A for hub server 14. FAST ATM 20A may generate the reports periodically according to a preset report cycle. For example, FAST ATM 20A may generate at least one of an operational performance report on FAST ATM 20A, an operational security report on FAST ATM 20A, or an operational compliance report on FAST ATM 20A. FAST ATM 20A then sends the reports to hub server 14 of network 10.

As illustrated in FIG. 1, hub server 14 is in communication with each of FAST ATMs 20. FAST ATMs 20B-20N may be configured to operate substantially similar to FAST ATM 20A. The functionality of hub server 14 may be implemented in hardware or in a combination of software and hardware, where requisite hardware may be provided to store and execute software instructions. While shown as a single computing device in the example of FIG. 1 for purposes of illustration, in some examples, hub server 14 may include a distributed network of computing devices including one or more workstations, servers, and/or other computing devices within network 10 or another private network. In some examples, hub server 14 may be associated with the financial institution that owns bank server 22 and FAST ATMs 20. In other examples, hub server 14 may be associated with a third-party entity responsible for monitoring suspicious activity and mitigating security threats on behalf of financial institution 24.

According to the disclosed techniques, hub server 14 receives the above described reports from each of FAST ATMs 20, and analyzes the reports to identify larger, global trends of suspicious activity and potential security threats. The reports collected by hub server 14 from FAST ATMs 20 may be employed to connect the dots between multiple sources for accurate profiling and omniscient viewing of potential criminal activity. The reports may assist in forensic analysis, and help detect performance and cyber-security related issues, risks, and vulnerabilities at ATMs.

Hub server 14 is also in communication with service support servers 26. Service support servers 26 may including one or more servers or other computing devices configured to manage the operation and maintenance of hub server 14 and/or FAST ATMs 20, store an updated database of known attack signatures, and/or store an updated database of blacklisted domains. The known attack signatures database may contain, for example, signatures of viruses, anomalies, vulnerabilities, and threats. For example, hub server 14 may use the database of known attack signatures and the database of blacklisted domains to update pre-recorded security policies at each of FAST ATMs 20. In some examples, one or more of the servers or computing devices of service support servers 26 may be hosted on hub server 14.

In addition to generating the periodic reports for hub server 14, FAST ATM 20A may also generate reports in response to detecting suspicious activity or potential threats. For example, upon intercepting the data packets, FAST ATM 20A may immediately perform deep packet inspection (DPI) on each of the intercepted data packets based on pre-recorded security policies. The pre-recorded security policies may be stored at FAST ATM 20A and periodically updated by hub server 14. In the case where FAST ATM 20A detects some suspicious activity based on the DPI, FAST ATM 20A may send an alarm message including an alarm report to hub server 14.

As another example, in response to receiving a request from hub server 14 for a comprehensive report of ATM operation during a time period of suspicious activity, FAST ATM 20A may analyze the actual transaction data, not merely the metadata, stored in the database to generate the requested comprehensive report for hub server 14. The request for the comprehensive report may be triggered based on hub server 14 detecting suspicious activity occurring at one or more of FAST ATMs 20, e.g., based on the periodic reports received from each of FAST ATMs 20 or receipt of an alarm report from any of FAST ATMs 20.

As a further example, FAST ATM 20A may also communicate with SEA device 32 (either directly or via hub server 14) to report a potential threat detected at FAST ATM 20A. Hub server 14 may subsequently receive a potential threat report from SEA device 32 based on aggregated data from across all of FAST ATMs 20. SEA device 32 is a computing device, e.g., a workstation, server, and/or other computing device, configured to receive, aggregate, and report potential security threats from FAST ATMs 20 and financial crime input. In some examples, SEA device 32 may be configured to receive and aggregate reports of physical threats at FAST ATMs 20. The functionality of SEA device 32 may be implemented in hardware or in a combination of software and hardware, where requisite hardware may be provided to store and execute software instructions. In FIG. 1, SEA device 32 is illustrated as being in direct communication with hub server 14, but may also be in direct communication with each of FAST ATMs 20.

For example, FAST ATM 20A may detect an anomaly in the operation of FAST ATM 20A, and report the anomaly as a potential threat to SEA device 32. SEA device 32 may also receive reports of potential threats detected by any of FAST ATMs 20, and aggregate the potential threat data from across all the FAST ATMs 20. SEA device 32 may aggregate the data more granularly, e.g., based on a location of the FAST ATMs or based on the type of threats being reported by the FAST ATMs.

SEA device 32 may generate and send potential threat reports to CI device 28, where the potential threat report indicates at least one potential threat based on the aggregated data from across FAST ATMs 20 and financial crime input. In this way, SEA device 32 may recognize a pattern of suspicious activity across multiple FAST ATMs and alert CI device 28 of the potential threat. In response to the potential threat report, CI device 28, for example, may access a remote database for FAST ATMs 20 and perform DPI, video content recognition, and event investigation on a timeline using the metadata and/or the mapped transaction data stored in the remote database for all of FAST ATMs 20. In this way, CI device 28 may identify a threat signature related to a potential threat indicated in the potential threat report. CI device 28 may then report the identified threat signature or any identified details to hub server 14. In other examples, CI device 28 may be hosted on hub server 14.

In some scenarios, in response to detected suspicious activity or potential threats, FAST ATM 20A may send a notification to user of FAST ATM 20A in an attempt to prevent or mitigate a security attack. For example, FAST ATM 20A may present on "out of service" message on its display device. In addition, FAST ATM 20A may disable operation of its card reader and/or its user input devices so as to no longer accept requests for financial transactions from users. As another example, FAST ATM 20A may disable one or more software processes or communication units so as to no longer transmit user login credentials, financial account information, or other sensitive information over network 10 toward bank server 22.

Figure 7:
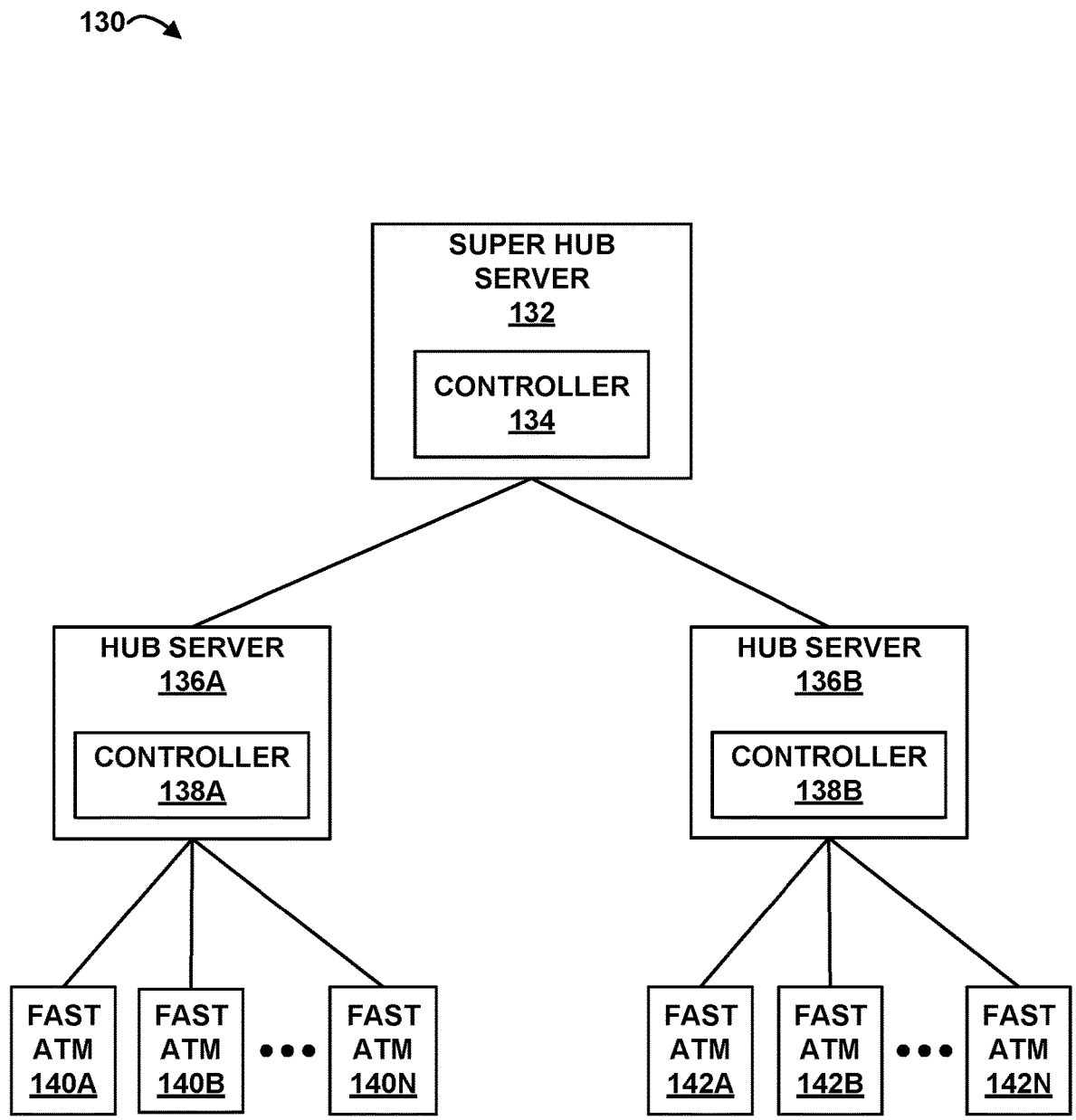
FIG. 7 is a block diagram illustrating an example network system including multiple hub servers for FAST ATMs in communication with a super hub server, in accordance with the techniques of this disclosure.

The architecture of network system 8 illustrated in FIG. 1 is shown for exemplary purposes only and network system 8 should not be limited to this architecture. Network system 8 illustrated in FIG. 1 shows a single hub server 14 in communication with a plurality of FAST ATMs 20. In other examples, network system 8 may include multiple different hub servers each in communication with a different set of FAST ATMs or conventional ATMs. In addition, network system 8 may include at least one super hub server in communication with the multiple different hub servers, as illustrated in FIG. 7. A hierarchal structure of FAST ATMs, hub servers, and super hub servers may offer a global infrastructure for FAST ATM.

Figure 2:
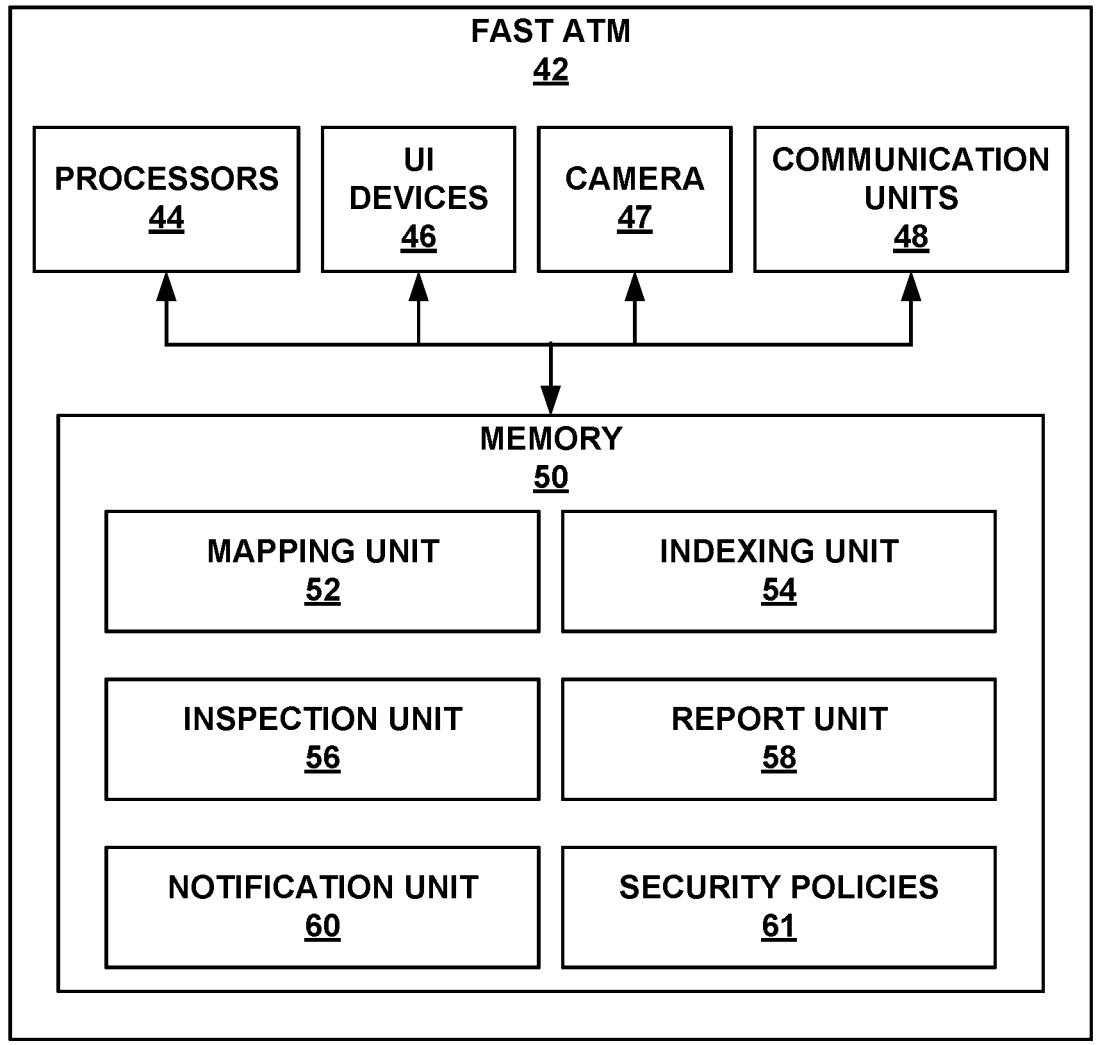
FIG. 2 is a block diagram illustrating an example of a FAST ATM, in accordance with the techniques of this disclosure.

FIG. 2 is a block diagram illustrating an example of a FAST ATM 42, in accordance with the techniques of this disclosure. FAST ATM 42 may operate substantially similar to FAST ATM 20A from FIG. 1. The architecture of FAST ATM 42 illustrated in FIG. 2 is shown for exemplary purposes only and FAST ATM 42 should not be limited to this architecture. In other examples, FAST ATM 42 may be configured in a variety of ways.

As shown in the example of FIG. 2, FAST ATM 42 includes one or more processors 44, one or more user interface (UI) devices 46, at least one camera 47, one or more communication units 48, and one or more memory units 50. FAST ATM 42 also includes mapping unit 52, indexing unit 54, inspection unit 56, report unit 58, notification unit 60, and security policies 61, each of which may be implemented as program instructions and/or data stored in memory 50 and executable by processors 44 or implemented as one or more hardware units or devices of FAST ATM 42. For example, memory 50 may include instructions that cause FAST ATM 42 to perform one or more of the techniques described in this disclosure. Memory 50 may also include an operating system (not shown) executable by processors 44 to control the operation of components of FAST ATM 42. The components, units or modules of FAST ATM 42 are coupled (physically, communicatively, and/or operatively) using communication channels for inter-component communications. In some examples, the communication channels may include a system bus, a network connection, an inter-process communication data structure, or any other method for communicating data.

Processors 44, in one example, may comprise one or more processors that are configured to implement functionality and/or process instructions for execution within FAST ATM 42. For example, processors 44 may be capable of processing instructions stored by memory 50. Processors 44 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 50 may be configured to store information within FAST ATM 42 during operation. Memory 50 may include a computer-readable storage medium or computer-readable storage device. In some examples, memory 50 includes one or more of a short-term memory or a long-term memory. Memory 50 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 50 is used to store program instructions for execution by processors 44. Memory 50 may be used by software or applications running on FAST ATM 42 to temporarily store information during program execution.

FAST ATM 42 may utilize communication units 48 to communicate with external devices via one or more networks, e.g., network 10 of FIG. 1. Communication units 48 may be network interfaces, such as Ethernet interfaces, optical transceivers, RF transceivers, or any other type of devices that can send and receive information. Other examples of interfaces may include Wi-Fi, near-field communication (NFC), or Bluetooth® radios. In some examples, FAST ATM 42 utilizes communication units 48 to wirelessly communicate with an external device, such as bank server 22, hub server 14, or SEA device 32.

UI devices 46 may be configured to operate as both input devices and output devices. For example, UI devices 46 may be configured to receive tactile, audio, or visual input from a user of FAST ATM 42. In addition to receiving input from a user, UI devices 46 may be configured to provide output to a user using tactile, audio, or video stimuli. In one example, UI devices 46 may be configured to output content such as a GUI for display at a display device. UI devices 46 may include a presence-sensitive display that displays a GUI and receives input from a user using capacitive, inductive, and/or optical detection at or near the presence sensitive display.

Other examples of UI devices 46 include a mouse, a keyboard, a card reader, a voice responsive system, video camera, microphone or any other type of device for detecting a command from a user, or a sound card, a video graphics adapter card, or any other type of device for converting a signal into an appropriate form understandable to humans or machines. Additional examples UI devices 46 include a speaker, a cathode ray tube (CRT) monitor, a liquid crystal display (LCD), organic light emitting diode (OLED), or any other type of device that can generate intelligible output to a user.

FAST ATM 42 may include additional components that, for clarity, are not shown in FIG. 2. For example, FAST ATM 42 may include a battery to provide power to the components of FAST ATM 42. Similarly, the components of FAST ATM 42 shown in FIG. 2 may not be necessary in every example of FAST ATM 42.

In accordance with the techniques described in this disclosure, FAST ATM 42 is configured to perform forensic assisting and tracing of transaction data generated by FAST ATM 42 for transmission to a bank server. The forensic assisting and tracing of the transaction data may be used to detect suspicious activity and potential security threats at FAST ATM 42 and/or at a global level across a network of ATMs, e.g., FAST ATMs 20 from FIG. 1.

To perform the disclosed techniques, FAST ATM 42 intercepts each data packet generated for transmission toward the bank server for every financial transaction initiated at FAST ATM 42. These data packets include transaction data, such as account numbers, user identifiers, and transaction amounts, and the like, related to monetary or non-monetary financial transactions. FAST ATM 42 records the transaction data in a database, which may be stored locally in memory 50 or remotely in the "cloud" or in a hub server, e.g., hub server 14 from FIG. 1. In the example of a local database, the database may comprise a circular queue or cache that holds a set amount of data. Once the queue or cache is full, the transaction data stored at FAST ATM 42 may be flushed from the local database and sent to an external memory. Distributed data storage in one or more remote databases may help to ensure that catastrophic data loss does not occur because of hardware or program failure, or because of the activities of malicious hackers.

Prior to storing the transaction data included in intercepted data packets for a given financial transaction, mapping unit 52 maps the transaction data to a time stamp indicating the time at which the financial transaction was requested at FAST ATM 42. Mapping unit 52 also maps the transaction data to context data collected from FAST ATM 42 during the financial transaction. For example, mapping unit 52 may map the transaction data including a user/transactor ID (e.g., received from the user's ATM card) and authentication information (e.g. biometrics, PIN, etc.) to camera data retrieved from camera 47 of FAST ATM 42 or other surveillance cameras at FAST ATM 42 or on the same network provided by the financial institution that owns FAST ATM 42, a time stamp (e.g., obtained from a global positioning system (GPS) time server), and location data (e.g., obtained from longitude/latitude coordinates programmed into FAST ATM 42 at the time of installation or from a GPS chip embedded in FAST ATM 42). If the financial transaction initiated at FAST ATM 42 also involves a remote live teller's assistance from a call center, any video session data from camera 47 and the live teller's camera may also be mapped and recorded with the transaction data. The mapped data by be encrypted and then stored in the local or remote database.

While storing the mapped transaction data, indexing unit 54 generates metadata/indexing for the mapped transaction data based on one or more parameters associated with the mapped transaction data. The indexing/metadata generation may be based on the user/transactor ID, IP address of FAST ATM 42, or any other single or multiple parameters to provide a basis for both rapid random lookups and efficient access of ordered records. Indexing not only improves the speed of data retrieval, but also offers the means to prepare high level reports. The terms "indexing" and "metadata" are used as synonyms and carry the same meaning in this disclosure.

Once the mapped transaction data and associated metadata is stored in the local or remote database, report unit 58 processes and analyzes the metadata for all the transaction data over a given time period, e.g., hourly, daily, or weekly. Report unit 58 then generates a report on the operation of FAST ATM 42 based on the analysis of the metadata for the mapped transaction data. Report unit 58 may generate the report periodically according to a present report cycle, e.g., hourly, daily, or weekly, and send the report to a hub server, e.g., hub server 14 of FIG. 1, via communication units 48 at a scheduled time.

In addition, while recording the transaction data included in the data packets generated by FAST ATM 42, inspection unit 56 may perform deep packet inspection (DPI). To perform DPI, inspection unit 56 may open each data packet and compare the contents with pre-recorded security policies 61 that define threat signatures for detecting protocol non-compliance, viruses, spam, intrusions, data mining, eavesdropping, censorship, or for collecting statistical information. Security policies 61 stored in memory 50 may be continuously updated by the hub server through a pre-established patch management policy. Patch management may help to combat newly discovered attacks and vulnerabilities. Security policies 61 may involve defense techniques against injection vulnerabilities, buffer overflow, sensitive data exposure, and zero-day exploits. The DPI techniques may be statistical-based, signature-based, behavior-based, or combination of all or any of these. The primary goal of each of these techniques is to identify suspicious activity or potential security threats in real time, or as close to real time as possible. Once a security attack is identified, the techniques may be able to quarantine the specific attack to eliminate or contain the damage caused by the attack to FAST ATM 42, and avoid propagating the attack deep into the network of the financial institution.

In the case where suspicious activity is detected by inspection unit 56 during DPI, report unit 58 may send an alarm and an alarm report to the hub server via communication units 48. Depending on the intensity of the detected suspicious activity, FAST ATM 42 may abort the corresponding financial transaction, and notification unit 60 may display an "out of service" message along with a civic address of the closest operational ATM via UI devices 46 for customer convenience. In the case where an anomaly is detected in the operation of FAST ATM 42, report unit 58 may report the anomaly as a potential threat to a suspicious event aggregator (SEA) executed on a remote computing device, e.g., SEA device 32 of FIG. 1.

In the case where suspicious activity is detected by the backend network and forensic assistance is requested from FAST ATM 42 in the field, FAST ATM 42 may receive a request for a comprehensive report from the hub server, and report unit 58 then processes a set of the actual mapped transaction data (i.e., not the corresponding metadata) during a time period of the suspicious activity detected by the hub server. Report unit 58 generates the comprehensive report based on the analysis, and sends the comprehensive report to the hub server via communication units 48. The comprehensive reports collected from several FAST ATMs may be employed by the hub server to connect the dots for accurate profiling and omniscient viewing of potential criminal activities. Based the transaction data collected, mapped, indexed, and saved by FAST ATM 42, report unit 58 may prepare reports for the hub server either automatically according to a preset report cycle or upon request. Report unit 58 may be configured to generate customized reports and forward the reports to a desired address (e.g., a portal or e-mail address).

The reports generated by report unit 58 may be categorized into following categories: ATM operational performance reports, ATM operational security reports, and ATM operational compliance reports. The ATM operational performance reports may include one or more of network utilization during any specific period of time, application performance, average response/round trip time, transaction volume, future bandwidth needs, network delay, network jitter, QoS, applications consuming maximum bandwidth during peak hours on the ATM network. The ATM operational performance reports may be used to assess operational efficiency, future planning, predicting traffic trends, capacity planning, strategic decision making, usage patterns, traffic bottlenecks, and optimization.

The ATM operational security reports may include one or more of security event severity distribution, most frequent breaches, highest offenders, number of failed transaction versus number of successful transactions, anomaly reports, host scanning, port scanning, scanned hosts, black listed domains, and domain name servers. The ATM operational security reports may be used for anomaly and potential security risk detection. The ATM operational compliance reports may include one or more of service Level agreements, network delays, and network agreed upon bandwidth versus allocated bandwidth.

Figure 3:
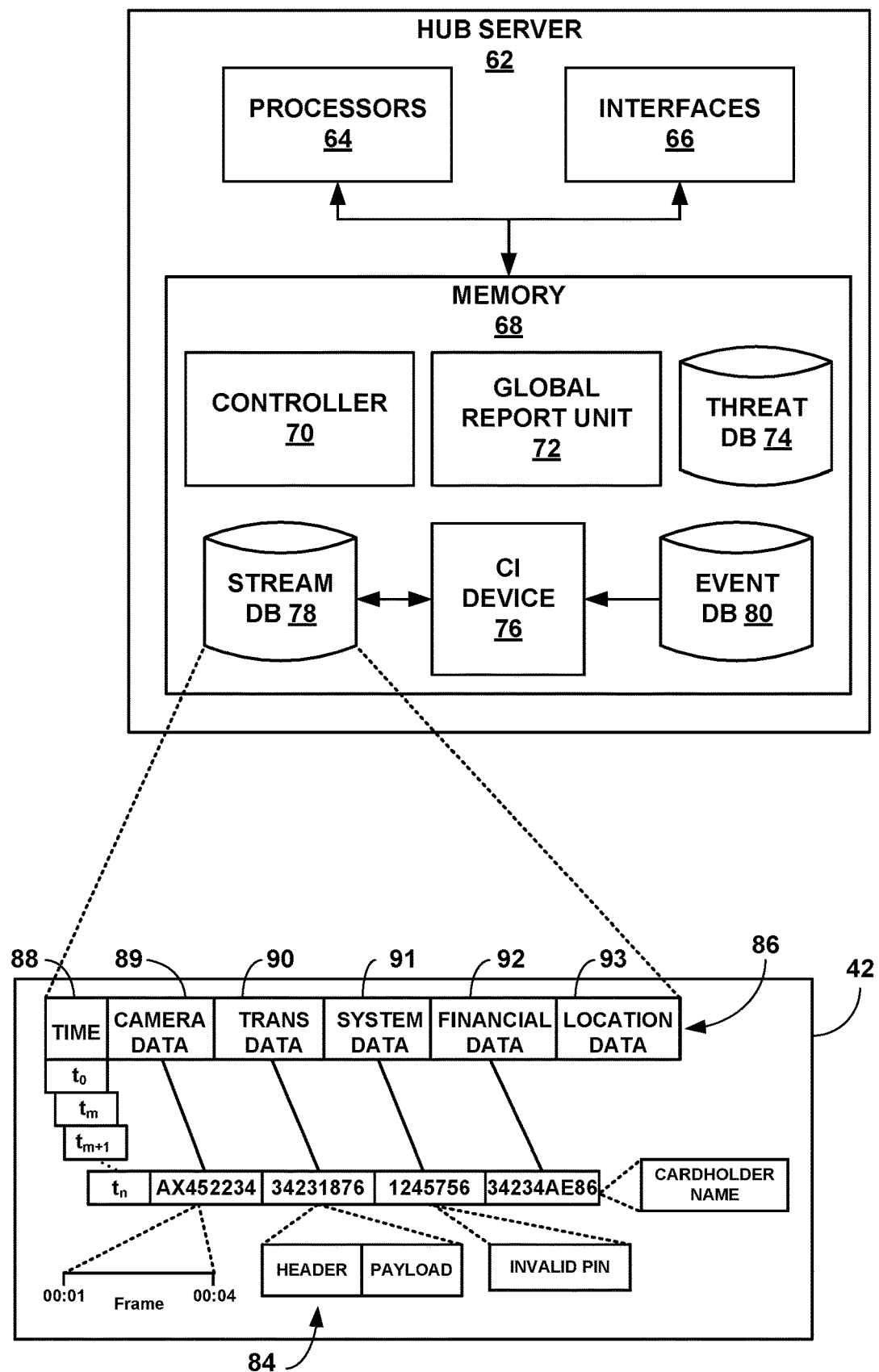
FIG. 3 is a block diagram illustrating an example hub server including a chief investigator (CI) device and a stream database of mapped and indexed transaction data for FAST ATMs, in accordance with the techniques of this disclosure.

FIG. 3 is a block diagram illustrating an example hub server 62 including a CI device 76 and a stream database 78 of mapped and indexed transaction data for FAST ATMs, in accordance with the techniques of this disclosure. Hub server 62 may operate substantially similar to hub server 14 from FIG. 1. The architecture of hub server 62 illustrated in FIG. 3 is shown for exemplary purposes only and hub server 62 should not be limited to this architecture. In other examples, hub server 62 may be configured in a variety of ways.

As shown in the example of FIG. 3, hub server 62 includes one or more processors 64, one or more interfaces 4866, and one or more memory units 68. Hub server 62 also includes a controller 70, a global report unit 72, a threat database 74, CI device 76, stream database 78, and an event database 80, each of which may be implemented as program instructions and/or data stored in memory units 68 and executable by processors 64 or implemented as one or more hardware units or devices of hub server 62. For example, memory 68 may include instructions that cause hub server 62 to perform one or more of the techniques described in this disclosure. Memory 68 may also include an operating system (not shown) executable by processors 64 to control the operation of components of hub server 62. Each of the components, units or modules of hub server 62 are coupled (physically, communicatively, and/or operatively) using communication channels for inter-component communications. In some examples, the communication channels may include a system bus, a network connection, an inter-process communication data structure, or any other method for communicating data.

Processors 64, in one example, may comprise one or more processors that are configured to implement functionality and/or process instructions for execution within hub server 62. For example, processors 64 may be capable of processing instructions stored by memory 68. Processors 64 may include, for example, microprocessors, DSPs, ASICs, FPGAs, or equivalent discrete or integrated logic circuitry, or a combination of any of the foregoing devices or circuitry.

Memory 68 may be configured to store information within hub server 62 during operation. Memory 68 may include a computer-readable storage medium or computer-readable storage device. In some examples, memory 68 includes one or more of a short-term memory or a long-term memory. Memory 68 may include, for example, RAM, DRAM, SRAM, magnetic discs, optical discs, flash memories, or forms of EPROM or EEPROM. In some examples, memory 68 is used to store program instructions for execution by processors 64. Memory 68 may be used by software or applications running on hub server 62 to temporarily store information during program execution.

Hub server 62 may utilize interfaces 66 to communicate with external devices via one or more networks, e.g., network 10 from FIG. 1. Interfaces 66 may be network interfaces, such as Ethernet interfaces, optical transceivers, RF transceivers, or any other type of devices that can send and receive information. Other examples of interfaces may include Wi-Fi, NFC, or Bluetooth® radios. According to the disclosed techniques, hub server 62 utilizes interfaces 66 to wirelessly communicate with a plurality of FAST ATMs, e.g., FAST ATMs 20 from FIG. 1. In some examples, hub server 62 may also utilize interfaces 66 to wirelessly communicate with other external devices, such as bank server 22, SEA device 32, or other service support servers 26.

Hub server 62 may include additional components that, for clarity, are not shown in FIG. 3. For example, hub server 62 may include a battery to provide power to the components of hub server 62. Similarly, the components of hub server 62 shown in FIG. 3 may not be necessary in every example of hub server 62.

As described above with respect to FIG. 2, FAST ATM 42 intercepts data packets 84 carrying transaction data of a financial transaction requested at FAST ATM 42, and stores the mapped and indexed transaction data in either a local database or a remote database. In the illustrated example of FIG. 3, FAST ATM 42 stores the mapped and indexed transaction data in remote stream database 78 included in hub server 62. More specifically, FAST ATM 42 maps the transaction data into a virtual data stream 86 of a plurality of data fields including a time stamp 88 indicating the time at which the financial transaction was requested at FAST ATM 42 and context data collected from FAST ATM 42 and having the same time stamp.

FAST ATM 42 stores virtual data stream 86 in stream database 78 of hub server 62. Virtual data stream 86 includes the following data fields: time stamp 88, transaction data 90 included in data packets 82, camera data 89 captured by camera 47 of FAST ATM 42 during the financial transaction, system event data 91 indicating functions performed at FAST ATM 42 to request the financial transaction, financial event data 92 indicating functions performed by FAST ATM 42 with the bank server to perform the financial transaction, and location data 93 of FAST ATM 42.

As illustrated in FIG. 3, camera data 89 may include a surveillance camera marker (e.g., "AX452234") at time stamp $t_n$ that refers to a specific frame of the recorded camera data. Transaction data 90 may include an ID (e.g., "34231876") at time stamp $t_n$ that refers to data packet 84 intercepted by FAST ATM 42 at the media access control (MAC) layer such as 802.3 packets for wireline data and IEEE 802.15 for Bluetooth data. System event data 91 may include an ID (e.g., "1245756") at time stamp $t_n$ that refers to a key press entry of an invalid PIN or another "physical" event that is functionally tied to FAST ATM 42. Financial event data 92 may include an ID (e.g., "34234AE86") at time stamp $t_n$ that refers to a cardholder name that is accessed or another "logical" event relevant to financial data. Location data 83 may include an ID that refers to GPS coordinates of FAST ATM 42, which remains the same at all time stamps.

In addition to storing the mapped and indexed transaction data in stream database 78 for each of a plurality of FAST ATMs, including FAST ATM 42, hub server 62 receives periodic reports from each of the plurality of FAST ATMs on operation of the respective one of the FAST ATMs. Based on the received periodic reports and the transaction data stored in stream database 78, controller 70 of hub server 62 may detect suspicious activity occurring at one or more of the plurality of FAST ATMs. Controller 70 may detect the suspicious activity based on analysis of periodic reports received from the FAST ATMs. Controller 70 may also request comprehensive reports from one or more of the FAST ATMs based on detecting the suspicious activity in order to gather additional information for further analysis.

In some examples, hub server 62 receives a potential threat report from a suspicious event aggregator executed on a remote computing device, e.g., SEA device 32 from FIG. 1. The SEA device may aggregate all potential threats data reported by various ATMs in the network, and manually or automatically entered from financial crime agencies and databases. The potential threat report indicates at least one potential threat based on the aggregated potential threat data. Hub server 62 stores the potential threat in event database 80. Based on the at least one potential threat stored in event database 80, controller 70 of hub server 62 may detect suspicious activity occurring at one or more of the plurality of FAST ATMs.

Regardless of how the suspicious activity is detected, CI device 76 of hub server 62 determines a threat signature for the detected suspicious activity based on analysis of stream database 78 and/or the periodic and comprehensive reports received from the plurality of FAST ATMs. For example, CI device 76 may determine a data pattern related to the detected suspicious activity based on analysis of the metadata and/or the mapped transaction data stored in stream database 78. CI device 76 may then identify the determined data pattern related to the suspicious activity as one of a known threat signature included in threat database 74 or an unknown threat signature. A more specific example of the operation of CI device 76 in response to detecting suspicious activity at one or more of the FAST ATMs is described in more detail below with respect to FIG. 4.

Controller 70 of hub server 62 may also be configured to manage each of the plurality of FAST ATMs in communication with hub server 62. Controller 70 may monitor performance and perform traffic analysis on a single FAST ATM, e.g., FAST ATM 42, or a group of the FAST ATMs. For example, the use of GPS time stamps for the transaction data and context data collected across all the FAST ATMs and stored in stream database 78 enables controller 70 to have an accurate vision of any anomalous behavior over the FAST ATM network.

Controller 70 may maintain threat database 74 that includes an updated list of known threat signatures. Threat database 74 may include signatures of viruses, anomalies, vulnerabilities, and other threats. Threat database 74 may also include an updated list of blacklisted domain name servers. Controller 70 may use threat database 74 to periodically update security policies recorded at each of the FAST ATMs, e.g., security policies 61 of FAST ATM 42.

Controller 70 may receive the periodic and comprehensive reports generated by the plurality of FAST ATMs, and present the reports to administrators associated with a financial institution that owns the FAST ATMs or third-party entity that owns hub server 62. The reports may be presented in a variety of different formats (e.g., PDF, CSV, etc.) and different presentations (e.g., tables, graphs, charts, diagrams). Controller 70 may also apply different levels of security to different reports that may have different user privileges, e.g. limited to one user, shared with multiple users, or viewable only be users with a certain security clearance level or company rank. In some examples, the administrators may query the mapped and indexed transaction data stored in stream database 78 using a query language, such as Structured Query Language (SQL). In response to the query, CI device 76 may perform further analysis of the metadata and/or the mapped transaction data stored in stream database 78. The reports may be printed or viewed on a user interface dashboard. The reports may also be forwarded to a desired email address.

Global report unit 72 of hub server 62 may be configured to generate global reports for an administrator or a super hub server, e.g., super hub server 132 from FIG. 7. As described in detail above, each of the connected FAST ATMs generate operational reports based on data it has collected and stored. Hub server 62 may then provide a broader vision by generating reports based on the information received from a group of FAST ATMs. The parameters of the reports generated by global report unit 72 may be configured based on granularity. For example, reports may be from milliseconds to minutes to hours to days to weeks and to months, etc. The global reports generated by global report unit 72 may be customized and refined using filter options. The options may be selected by administrators via user interfaces, e.g., GUIs or CLIs, at hub server 62. For example, the administrators may specify the time, duration, report format, report parameters, including the email address at which the reports are desired to be published.

Similar to the reports generated by the FAST ATMs, global report unit 72 of hub server 62 may also generate several different types of reports. These reports generated by global report unit 72 may be categorized into following categories: global performance reports, global security reports, global compliance reports, and global special reports. The global performance reports may include one or more of issuer latency, issuer session pool, acquirer, destination stations, source stations, and top transactions.

The global security reports may include one or more of security event severity distribution, most frequent breaches, highest offenders, number of failed transaction versus number of successful transactions, anomaly reports, host scanning, port scanning, scanned hosts, black listed domains, domain name servers, and potential security risk on ATM wireless networks. The global special reports may include one or more of capacity planning, network heat charts, and baseline reports to compare reports against a set benchmark or compare the current value of a network parameter with a past (baseline) value of the same parameter over a selected time period. The reports that indicate decreased performance are likely to be a leading indicator for breach of security. As an example, a TCP listener application that is unable to answer legitimate client application requests for new TCP connections might indicate that TCP SYN Flooding or DOS attack is happening.

Figure 4:
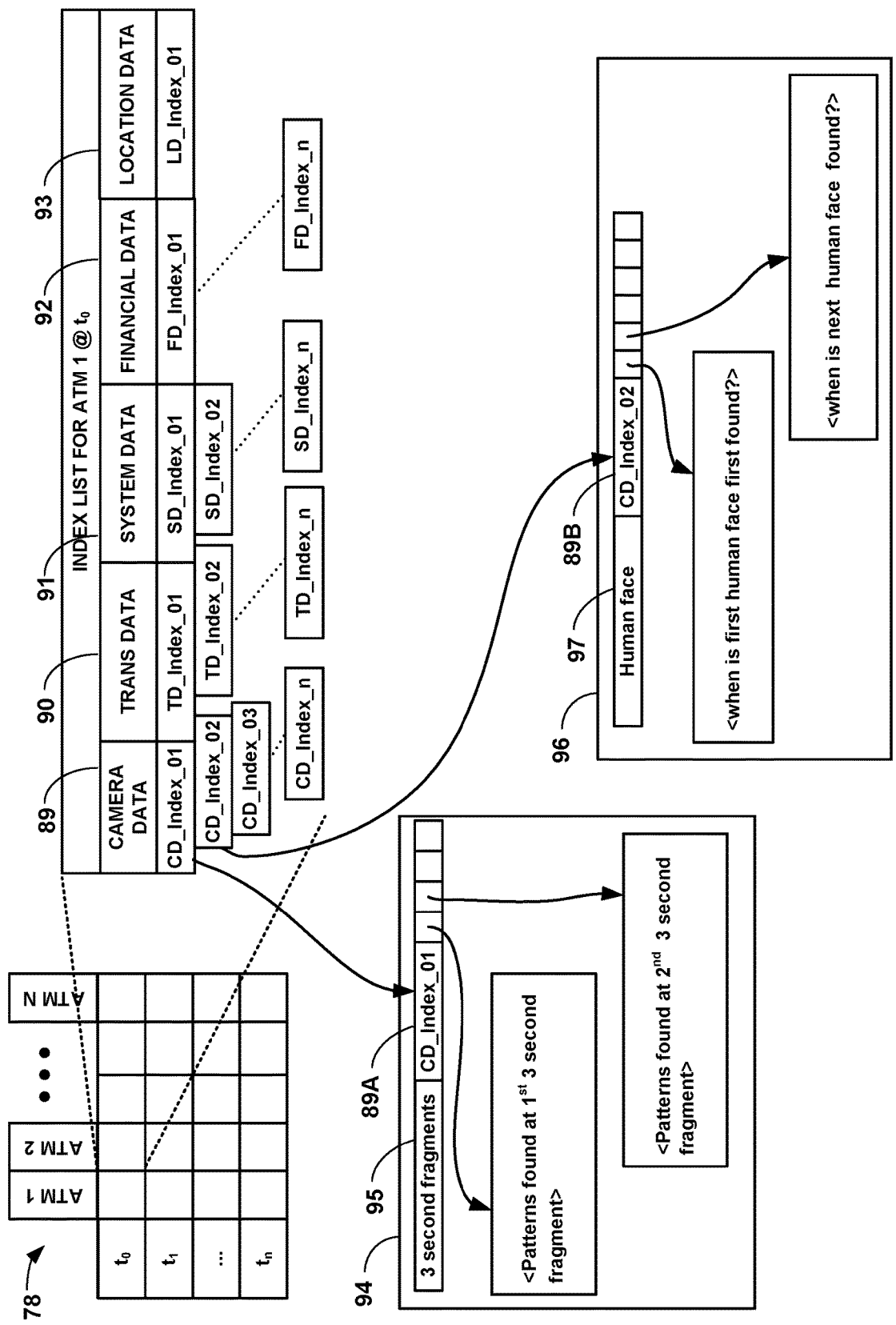
FIG. 4 is a conceptual diagram illustrating an example of the mapped and indexed transaction data stored in the stream database from FIG. 3 in greater detail.

FIG. 4 is a conceptual diagram illustrating an example of the mapped and indexed transaction data stored in stream database 78 of hub server 62 from FIG. 3 in greater detail. As described above with respect to FIG. 3, as part of indexing, FAST ATM 42 analyzes each of the data fields included in the virtual data stream 86 (i.e., camera data 89, transaction data 90, system event data 91, financial event data 92, and location data 93) at a given time stamp 88 to identify one or more parameters of each of the data fields. FAST ATM 42 then generates metadata for the mapped transaction data as an index to each of the one or more parameters of each of the data fields. For example, as illustrated, in the index list for time stamp to, camera data 89 includes indices CD_Index_01 through CD_Index_n, transaction data 90 includes indices TD_Index_01 through TD_Index_n, system event data 91 includes indices SD_Index_01 through SD_Index_n, financial event data 92 includes indices FD_Index_01 through FD_Index_n, and location data 93 includes index LD_Index_01.

As illustrated in FIG. 4, FAST ATM 42 generates metadata 94 as CD_Index_01 89A to the "3 second fragments" parameter 95 of camera data 89 within virtual data stream 86 at time stamp to. As further illustrated in FIG. 4, FAST ATM 42 also generates metadata 96 as CD_Index_02 89B to the "human face" parameter 97 of camera data 89 within virtual data stream 86 at time stamp to. In the illustrated example, therefore, FAST ATM 42 indexes camera data 89 at time stamp to in at least two different ways. The first index 89A represents metadata 94 in which the captured surveillance camera video is broken into the 3 second segments and patterns are recognized within each of the 3 second fragments. The second index 89B represents metadata 96 that identifies each surveillance camera video frame where a human face first shows up and indicates whether the face is of a known customer or not. As part of indexing, FAST ATM 42 may execute machine learning applications such as image (e.g., facial and/or object) recognition, pattern detection, and various other techniques for the identification of relevant features from the large input datasets based on the indices.

Although virtual data stream 86 is primarily described herein as including surveillance camera data, in other examples the data collected from other sensors at FAST ATM 42 may also (or alternatively) be included in the virtual data stream. For example, the other possible sensors may include motion sensors, infrared (IR) sensors, temperature sensors, and the like. In some examples, FAST ATM 42 may also be capable of supporting remote live teller assistance from a call center such that the context data mapped to transaction data 90 in virtual data stream 86 may also include video and/or audio data of the conversation between the user at FAST ATM 42 and the operator at the call center.

In one example use case with respect to FIGS. 3 and 4, CI device 76 of hub server 62 may receive the potential threat report from the SEA device, and store the potential threat report in event database 80. CI device 76 first analyzes the various metadata in the index list of stream database 78, and may review the actual data included in the relevant portion of virtual data stream 86 for further investigations. CI device 76 looks for patterns based on various metadata associated with the given data. For example, CI device 76 may perform DPI, video content recognition, and event investigation on a timeline using the metadata and/or the mapped transaction data stored in stream database 78 for the plurality of FAST ATMs. In this way, CI device 76 may correlate patterns in the data for a first one of the FAST ATMs with patterns in the data for a second one of the FAST ATMS and identify a potential coordinated attack.

In one example, upon receiving notification in the potential threat report that three other ATMs in the same neighborhood as FAST ATM 42 were vandalized, CI device 76 searches the index list for metadata 94 that includes the "3 second fragment" parameter 95 for keywords such as "breaking," "throwing," and the like that would signify a physical attack on FAST ATM 42. CI device 76 then uses the search results' time stamps to further analyze relevant metadata/indices having the same time stamp (e.g., a cardholder name or other identifier of a user requesting a financial transaction at that time) to identify pertinent details that may be related to the potential threat report.

In another example, upon receiving notification in the potential threat report that there was an attempt to open a transmission control protocol (TCP) port by an unknown program at one or more other ATMs in the same network as FAST ATM 42, CI device 76 searches the index list for metadata associated with the transaction data 90 to identify data patterns that might match the intrusion and/or attack signatures of well-known malwares that would signify a logical attack on FAST ATM 42.

Figure 5:
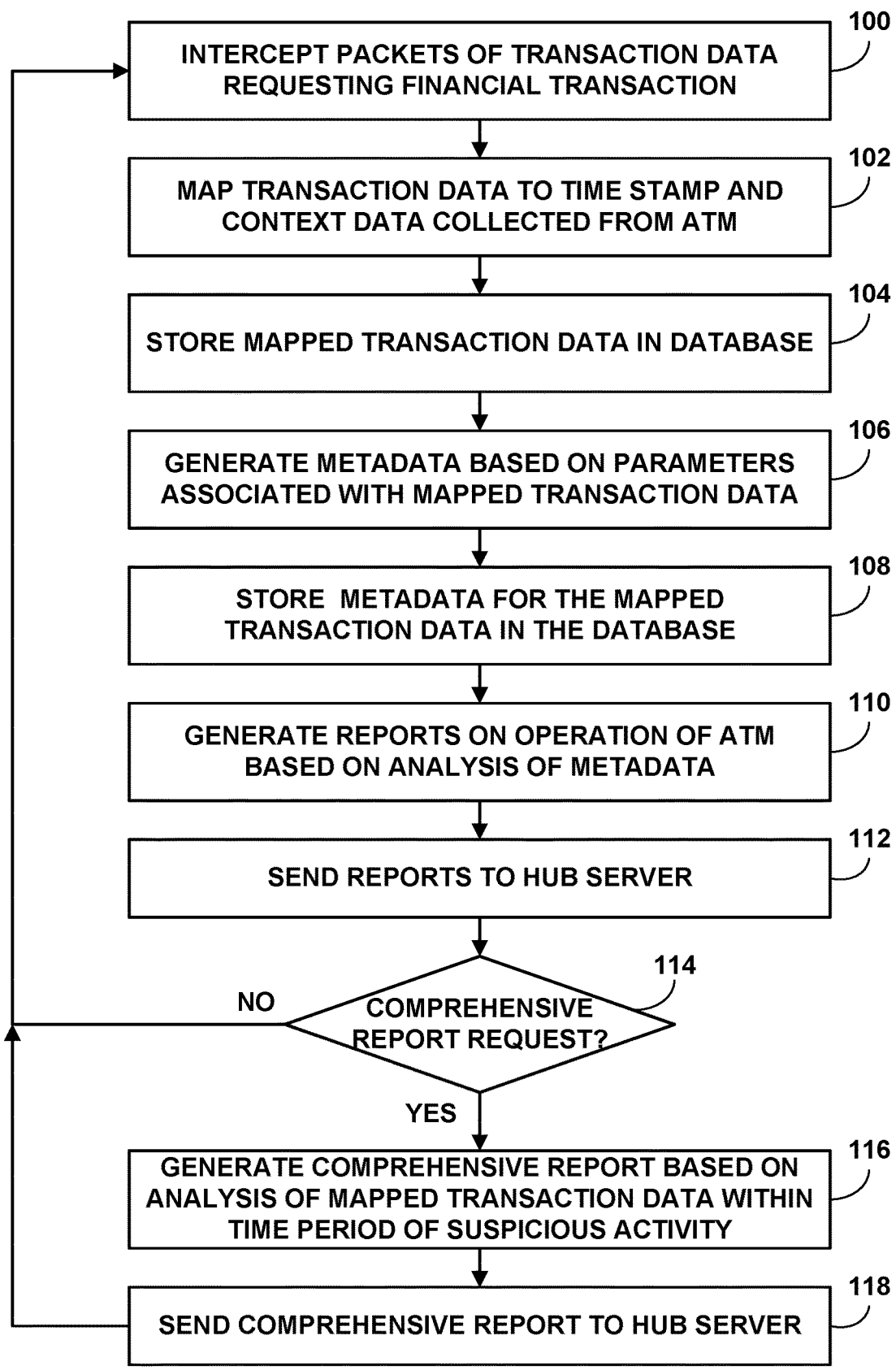
FIG. 5 is a flowchart illustrating an example operation of forensic assisting and tracing of data packets for a FAST ATM, in accordance with the techniques of this disclosure.

FIG. 5 is a flowchart illustrating an example operation of forensic assisting and tracing of data packets for a FAST ATM, in accordance with the techniques of this disclosure. The example operation of FIG. 5 is described with respect to FAST ATM 42 from FIGS. 2 and 3. In other examples, the operation of FIG. 5 may also be performed by any of FAST ATMs 20 from FIG. 1.

FAST ATM 42 may be used by a cardholder to perform a financial transaction with an account owned by the cardholder and held at an associated financial institution. In response to inputs from the cardholder, FAST ATM 42 transmits data packets to a bank server of the financial institution requesting performance of the financial transaction. According to the techniques described in this disclosure, FAST ATM 42 intercepts the data packets, including transaction data for the requested financial transaction, prior to transmission to the bank server (100).

Mapping unit 52 of FAST ATM 42 maps the transaction data included in the data packets to a time stamp indicating the time at which the financial transaction was requested at FAST ATM 42 and context data collected from FAST ATM 42 and having the same time stamp (102). More specifically, mapping unit 52 may generate virtual data stream 86 including the following data fields: the time stamp 88, the transaction data 90 included in the data packets, and at least one of location data 93 of FAST ATM 42, system event data 91 indicating functions performed at FAST ATM 42 to request the financial transaction, financial event data 92 indicating functions performed by FAST ATM 42 with the bank server to perform the financial transaction, and camera data 89 captured by FAST ATM 42 during the financial transaction.

FAST ATM 42 stores the mapped transaction data in a database for FAST ATM 42 (104). In some examples, the database may be a local database included in memory 50 of FAST ATM 42. In other examples, the database may be included in a remote computing device, e.g., stream database 78 of hub server 62, and the database may store mapped transaction data for a plurality of ATMs in communication with the remote computing device.

Indexing unit 54 of FAST ATM 42 then generates metadata for the mapped transaction data based on one or more parameters associated with the mapped transaction data (106). More specifically, indexing unit 54 may analyze each of the data fields included in the virtual data stream 86 to identify the one or more parameters of each of the data fields used to generate reports for a hub server, e.g., hub server 62 of FIG. 3. Indexing unit 54 may then generate the metadata as an index to each of the one or more parameters of each of the data fields. For example, as illustrated in FIG. 4, indexing unit 54 may generate metadata 94 as CD_Index_01 89A to the "3 second fragments" parameter 95 of camera data 89 within virtual data stream 86 at time stamp to. As further illustrated in FIG. 4, indexing unit 54 may also generate metadata 96 as CD_Index_02 89B to the "human face" parameter 97 of camera data 89 within virtual data stream 86 at time stamp to. FAST ATM 42 stores the metadata for the mapped transaction data in the same database with the mapped transaction data (108).

Report unit 58 of FAST ATM 42 then generates one or more reports on operation of FAST ATM 42 based on analysis of at least a portion of the metadata for the mapped transaction data (110). In some examples, report unit 58 may generate the reports periodically according to a preset report cycle. For example, report unit 58 may generate at least one of an operational performance report on FAST ATM 42, an operational security report on FAST ATM 42, or an operational compliance report on FAST ATM 42. Report unit 58 sends the reports on the operation of FAST ATM 42 to the hub server, e.g., hub server 62 of FIG. 3 (112).

Report unit 58 of FAST ATM 42 may also generate reports in response to detecting suspicious activity or potential threats. For example, inspection unit 56 of FAST ATM 42 may detect an anomaly in the operation of FAST ATM 42, and report unit 58 may report the anomaly as a potential threat to a suspicious event aggregator executed on a remote computing device, e.g., SEA device 32 of FIG. 1. As a further example, inspection unit 56 may perform deep packet inspection on each of the intercepted data packets based on security policies 61, and detect suspicious activity based on the deep packet inspection, and, in response to the detected suspicious activity. Report unit 58 may send an alarm message including an alarm report to the hub server, e.g., hub server 62 of FIG. 3.

In addition to generating the above described reports based on the metadata for the mapped transaction data, report unit 58 may also generate reports based on the mapped transaction data itself in response to requests from the hub server. In the case where FAST ATM 42 receives a request from the hub server for a comprehensive report on the operation of FAST ATM 42 during a time period of suspicious activity detected by the hub server (YES branch of 114), report unit 58 generates the comprehensive report based on analysis of a set of the mapped transaction data having time stamps within the time period of the suspicious activity (116). FAST ATM 42 then sends the comprehensive report to the hub server (118). After sending the comprehensive report (118) or in the case where FAST ATM 42 does not receive a request for a comprehensive report (NO branch of 114), FAST ATM 42 returns to intercepting data packets (100) and subsequently storing the mapped transaction data and corresponding metadata in the database for generation of reports to the hub server.

Figure 6:
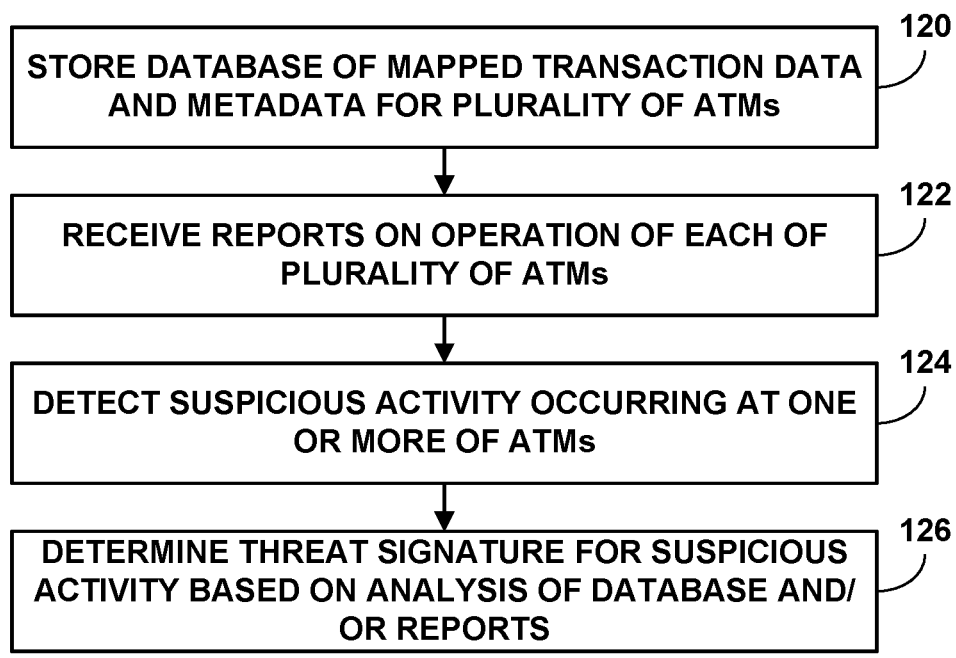
FIG. 6 is a flowchart illustrating an example operation of determining threat signatures of suspicious activity at one or more FAST ATMs in communication with a hub server, in accordance with the techniques of this disclosure.

FIG. 6 is a flowchart illustrating an example operation of determining threat signatures of suspicious activity at one or more FAST ATMs in communication with a hub server, in accordance with the techniques of this disclosure. The example operation of FIG. 6 is described with respect to hub server 62 from FIG. 3. In other examples, the operation of FIG. 6 may also be performed by hub server 14 from FIG. 1.

As discussed above, hub server 62 is in communication with a plurality of FAST ATMs, e.g., FAST ATMs 20 from FIG. 1 and/or FAST ATM 42 from FIGS. 2 and 3. In one example, hub server 62 includes CI device 76, stream database 78, and event database 80. In this example, hub server 62 stores mapped transaction data and metadata for the mapped transaction data for each of the FAST ATMs in stream database 78 (120). The mapped transaction data and corresponding metadata may be generated by each of the FAST ATMs as described above with respect to FIG. 5. Hub server 62 also receives reports on operation of each of the FAST ATMs (122).

Hub server 62 detects suspicious activity occurring at one or more of the plurality of FAST ATMs (124). In some examples, hub server 62 may receive periodic reports from each of the plurality of FAST ATMs where the periodic reports are on the metadata for the mapped transaction data for each of the plurality of FAST ATMs, and detect the suspicious activity occurring at the one or more FAST ATMs based on analysis of the received periodic reports. In other examples, hub server 62 may receive a potential threat report from a suspicious event aggregator executed on a remote computing device, e.g., SEA device 32 from FIG. 1. The potential threat report indicates at least one potential threat based on potential threat data that SEA device 32 aggregated from each of the plurality of FAST ATMs and financial crime input. Hub server 62 stores the at least one potential threat included in the potential threat report in event database 80. Hub server 62 may detect the suspicious activity occurring at the one or more FAST ATMs based on analysis of the at least one potential threat stored in event database 80.

In response to detecting the suspicious activity, hub server 62 may request comprehensive reports from each of the plurality of FAST ATMs for a time period of suspicious activity. In response to the request, hub server 62 may receive the comprehensive reports from each of the plurality of FAST ATMs where the comprehensive reports are generated based on the mapped transaction data from each of the plurality of FAST ATMs. In some examples, global report unit 72 of hub server 62 may also generate one or more global reports on operation of the plurality of ATMs where the one or more global reports are generated based on analysis of stream database 78 for the plurality of ATMs and/or the periodic and comprehensive reports received from the plurality of ATMs.

Hub server 62 determines a threat signature for the detected suspicious activity based on analysis of stream database 78 for the plurality of FAST ATMs and/or the periodic and comprehensive reports received from the plurality of FAST ATMs (126). More specifically, CI device 76 may determine a data pattern related to the detected suspicious activity based on analysis of the metadata and/or the mapped transaction data stored in stream database 78 for the plurality of FAST ATMs, and identify the determined data pattern related to the suspicious activity as one of a known threat signature included in threat database 74 or an unknown threat signature.

To determine the data pattern, CI device 76 may perform DPI, video content recognition, and event investigation on a timeline using the metadata and/or the mapped transaction data stored in stream database 78 for the plurality of FAST ATMs. For example, CI device 76 may search the metadata stored in stream database 78 that is associated with a given parameter of the mapped transaction data for two or more of the FAST ATMs using keywords related to the suspicious activity. CI device 76 identifies a time stamp associated with results of the search, and then determines the data pattern based on the metadata associated with other parameters of the mapped transaction data stored in stream database 78 for the two or more of the FAST ATMs at the identified time stamp. CI device 76 may also perform DPI on the mapped transaction data stored in stream database 78 for the two or more of the FAST ATMs at the identified time stamp.

FIG. 7 is a block diagram illustrating an example network system 130 including multiple hub servers 136A-136B (collectively, "hub servers 136") for FAST ATMs in communication with a super hub server 132, in accordance with the techniques of this disclosure. As illustrated in FIG. 7, hub server 136A includes a controller 138A and is in communication with FAST ATMs 140A-140C (collectively, "FAST ATMs 140"); and hub server 136B includes a controller 138B and is in communication with FAST ATMs 142A-142C (collectively, "FAST ATMs 142"). Hub servers 136 may operate substantially similar to hub server 14 from FIG. 1 and hub server 62 from FIG. 3. FAST ATMs 140, 142 may operate substantially similar to FAST ATMs 20 from FIG. 1 and FAST ATM 42 from FIG. 2. As further illustrated in FIG. 7, super hub server 132 includes a controller 134 and is in communication with hub servers 136. Controller 134 of super hub server 132 and controllers 138 of hub servers 136 may each present a user interface dashboard from which administrators may access, print, or email, security reports.

Controllers 138 of hub servers 136 may each operate substantially similar to controller 70 of hub server 62 from FIG. 3. Controllers 138 may each be configured to perform several functions, such as: remote login to each of FAST ATMs 140, 142, respectively, and management of FAST ATMs 140, 142, respectively. Controllers 138 of hub servers 136 may also monitor performance and perform traffic analysis on a single FAST ATM or a group of FAST ATMs. Each of hub servers 136 may maintain a central and updated database of threat signatures and blacklisted domain name servers. Controllers 138 of hub servers 136 may use this information to update security policies recorded at each of FAST ATMs 140, 142.

Controllers 138 of hub servers 136 may receive the reports send by FAST ATMs 140, 142, and present the reports to administrators in a variety of different formats and in accordance with different levels of security. Hub servers 136 are not only capable of collecting reports from the distributed FAST ATMs 140, 142, but also creating global reports for super hub server 132. Super hub server 132 may perform substantially similar functions as each of hub servers 136, but at the next higher level.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A server device in communication with a plurality of automated teller machines (ATMs), the server device comprising:
a memory including a database that stores mapped transaction data and metadata for the mapped transaction data for each of the plurality of ATMs; and
one or more processors in communication with the memory and configured to:
receive reports on operation of each of the plurality of ATMs, wherein the reports are generated based on a least a portion of the metadata for the mapped transaction data for each of the plurality of ATMs;
detect suspicious activity occurring at one or more of the plurality of ATMs; and
determine a threat signature for the suspicious activity based on analysis of one or more of the database for the plurality of ATMs or the reports on operation of the plurality of ATMs.

2. The server device of claim 1, wherein the one or more processors are configured to:
receive periodic reports from each of the plurality of ATMs, wherein the periodic reports are based on the metadata for the mapped transaction data for each of the plurality of ATMs; and
detect the suspicious activity occurring at the one or more of the ATMs based on analysis of the received periodic reports.

3. The server device of claim 1, wherein the one or more processors are configured to:
in response to detecting the suspicious activity, request comprehensive reports from each of the plurality of ATMs for a time period of the suspicious activity; and
in response to the request, receive the comprehensive reports from each of the plurality of ATMs, wherein the comprehensive reports are based on the mapped transaction data for each of the plurality of ATMs.

4. The server device of claim 1, wherein the one or more processors are configured to:
receive a potential threat report from a suspicious event aggregator executed on a remote computing device in communication with the server device, wherein the potential threat report indicates at least one potential threat based on potential threat data aggregated from each of the plurality of ATMs and financial crime input; and
detect the suspicious activity occurring at the one or more of the ATMs based on the at least one potential threat.

5. The server device of claim 1, wherein, to determine the threat signature for the suspicious activity, the one or more processors are configured to:
determine a data pattern related to the suspicious activity based on analysis of one or more of the metadata or the mapped transaction data stored in the database for the plurality of ATMs; and
identify the determined data pattern related to the suspicious activity as one of a known threat signature or an unknown threat signature.

6. The service device of claim 1, wherein the memory includes a threat database that stores known threat signatures, and wherein the one or more processors are configured to periodically update security policies for each of the plurality of ATMs based on the threat database.

7. The server device of claim 1, wherein the one or more processors are configured to generate one or more global reports on operation of the plurality of ATMs, wherein the one or more global reports are generated based on analysis of one or more of the database for the plurality of ATMs or the reports on operation of the plurality of ATMs.

8. A computer-based method comprising:
storing, in a database of a server device in communication with a plurality of automated teller machines (ATMs), mapped transaction data and metadata for the mapped transaction data for each of the plurality of ATMs;
receiving, by the server device, reports on operation of each of the plurality of ATMs, wherein the reports are generated based on a least a portion of the metadata for the mapped transaction data for each of the plurality of ATMs;
detecting, by the server device, suspicious activity occurring at one or more of the plurality of ATMs; and
determining, by the server device, a threat signature for the suspicious activity based on analysis of one or more of the database for the plurality of ATMs or the reports on operation of the plurality of ATMs.

9. The method of claim 8,
wherein receiving the reports comprises receiving periodic reports from each of the plurality of ATMs, wherein the periodic reports are based on the metadata for the mapped transaction data for each of the plurality of ATMs; and
wherein detecting the suspicious activity comprises detecting the suspicious activity occurring at the one or more of the ATMs based on analysis of the received periodic reports.

10. The method of claim 8, wherein receiving the reports comprises:
in response to detecting the suspicious activity, requesting comprehensive reports from each of the plurality of ATMs for a time period of the suspicious activity; and
in response to the request, receiving the comprehensive reports from each of the plurality of ATMs, wherein the comprehensive reports are based on the mapped transaction data for each of the plurality of ATMs.

11. The method of claim 8,
wherein receiving the reports comprises receiving a potential threat report from a suspicious event aggregator executed on a remote computing device in communication with the server device, wherein the potential threat report indicates at least one potential threat based on potential threat data aggregated from each of the plurality of ATMs and financial crime input; and
wherein detecting the suspicious activity comprises detecting the suspicious activity occurring at the one or more of the ATMs based on the at least one potential threat.

12. The method of claim 8, wherein determining the threat signature for the suspicious activity comprises:
determining a data pattern related to the suspicious activity based on analysis of one or more of the metadata or the mapped transaction data stored in the database for the plurality of ATMs; and
identifying the determined data pattern related to the suspicious activity as one of a known threat signature or an unknown threat signature.

13. The method of claim 8, further comprising storing known threat signatures in a threat database of the server device, and periodically updating security policies for each of the plurality of ATMs based on the threat database.

14. The method of claim 8, further comprising generating one or more global reports on operation of the plurality of ATMs, wherein the one or more global reports are generated based on analysis of one or more of the database for the plurality of ATMs or the reports on operation of the plurality of ATMs.

15. A non-transitory computer-readable medium comprising instructions that, when executed, cause one or more processors of a server device in communication with a plurality of automated teller machines (ATMs) to:
store, in a database of the server device, mapped transaction data and metadata for the mapped transaction data for each of the plurality of ATMs;
receive reports on operation of each of the plurality of ATMs, wherein the reports are generated based on a least a portion of the metadata for the mapped transaction data for each of the plurality of ATMs;
detect suspicious activity occurring at one or more of the plurality of ATMs; and
determine a threat signature for the suspicious activity based on analysis of one or more of the database for the plurality of ATMs or the reports on operation of the plurality of ATMs.

16. The non-transitory computer-readable medium of claim 15, wherein the instructions, when executed, cause the one or more processors to:
receive periodic reports from each of the plurality of ATMs, wherein the periodic reports are based on the metadata for the mapped transaction data for each of the plurality of ATMs; and
detect the suspicious activity occurring at the one or more of the ATMs based on analysis of the received periodic reports.

17. The non-transitory computer-readable medium of claim 15, wherein the instructions, when executed, cause the one or more processors to:
in response to detecting the suspicious activity, request comprehensive reports from each of the plurality of ATMs for a time period of the suspicious activity; and
in response to the request, receive the comprehensive reports from each of the plurality of ATMs, wherein the comprehensive reports are based on the mapped transaction data for each of the plurality of ATMs.

18. The non-transitory computer-readable medium of claim 15, wherein the instructions, when executed, cause the one or more processors to:
receive a potential threat report from a suspicious event aggregator executed on a remote computing device in communication with the server device, wherein the potential threat report indicates at least one potential threat based on potential threat data aggregated from each of the plurality of ATMs and financial crime input; and
detect the suspicious activity occurring at the one or more of the ATMs based on the at least one potential threat.

19. The non-transitory computer-readable storage medium of claim 15, wherein the instructions to determine the threat signature for the suspicious activity further comprise instructions that, when executed, cause the one or more processors to:
determine a data pattern related to the suspicious activity based on analysis of one or more of the metadata or the mapped transaction data stored in the database for the plurality of ATMs; and
identify the determined data pattern related to the suspicious activity as one of a known threat signature or an unknown threat signature.

20. The non-transitory computer-readable medium of claim 15, wherein the instructions, when executed, cause the one or more processors to:
store known threat signatures in a threat database of the server device; and
periodically update security policies for each of the plurality of ATMs based on the threat database.

* * * * *